United States Patent [19]
Livesay et al.

[11] Patent Number: 4,819,999
[45] Date of Patent: Apr. 11, 1989

[54] END FACE SEAL ASSEMBLY

[75] Inventors: Richard E. Livesay, Peoria; Robert J. Purcell, Washington; Blair A. Maust, Dunlap, all of Ill.

[73] Assignee: Caterpillar Inc., Peoria, Ill.

[21] Appl. No.: 72,933

[22] Filed: Jul. 13, 1987

[51] Int. Cl.$^4$ .................. F16J 15/34; F16J 15/38; B62D 55/88
[52] U.S. Cl. ...................... 305/11; 277/84; 277/92; 277/96.2; 277/184
[58] Field of Search ............... 277/84, 92, 96.2, 81 R, 277/95, 184; 305/11

[56] References Cited

U.S. PATENT DOCUMENTS

| | | | |
|---|---|---|---|
| 2,795,441 | 6/1957 | Gilbert et al. | 277/95 |
| 3,195,902 | 7/1965 | Tisch | 277/95 |
| 3,467,448 | 9/1969 | Galle | 277/81 R X |
| 3,584,886 | 6/1971 | Simpson et al. | 277/92 |
| 3,841,718 | 10/1974 | Reinsma | 305/11 |
| 3,909,310 | 9/1975 | Uy | 277/81 R X |
| 4,195,852 | 4/1980 | Roley et al. | 277/92 |
| 4,209,204 | 6/1980 | Wagner et al. | 277/92 X |
| 4,262,914 | 4/1981 | Roley | 277/84 |
| 4,295,654 | 10/1981 | Kawamura et al. | 305/11 X |
| 4,306,727 | 12/1981 | Deane et al. | 277/84 X |
| 4,331,339 | 5/1982 | Reinsma | 277/92 X |
| 4,386,969 | 6/1983 | Kilbert | 277/96.2 X |

Primary Examiner—Allan N. Shoap
Attorney, Agent, or Firm—O. Gordon Pence

[57] ABSTRACT

An end face seal assembly is disclosed for use in severe service applications, such as for use in sealing a track joint. The seal assembly includes a rubber load ring, an L-shaped metal seal ring and a polyurethane seal ring. The polyurethane seal ring is mounted in a groove provided in the end face of the track bushing and has a seal lip which dynamically seals against a radial sealing surface of the metal seal ring. The load ring mounts the metal ring in the counterbore of the outer track link and provides the axial force for urging the metal seal ring into axial sealing engagement against the seal lip. The seal assembly eliminates grooving of the bushing end face which occurs with the use of prior art seals which use such end face as a dynamic sealing surface. The metal seal ring of the present seal assembly is made of an extremely hard and corrosion resistant material so as to virtually eliminate such grooving.

17 Claims, 2 Drawing Sheets

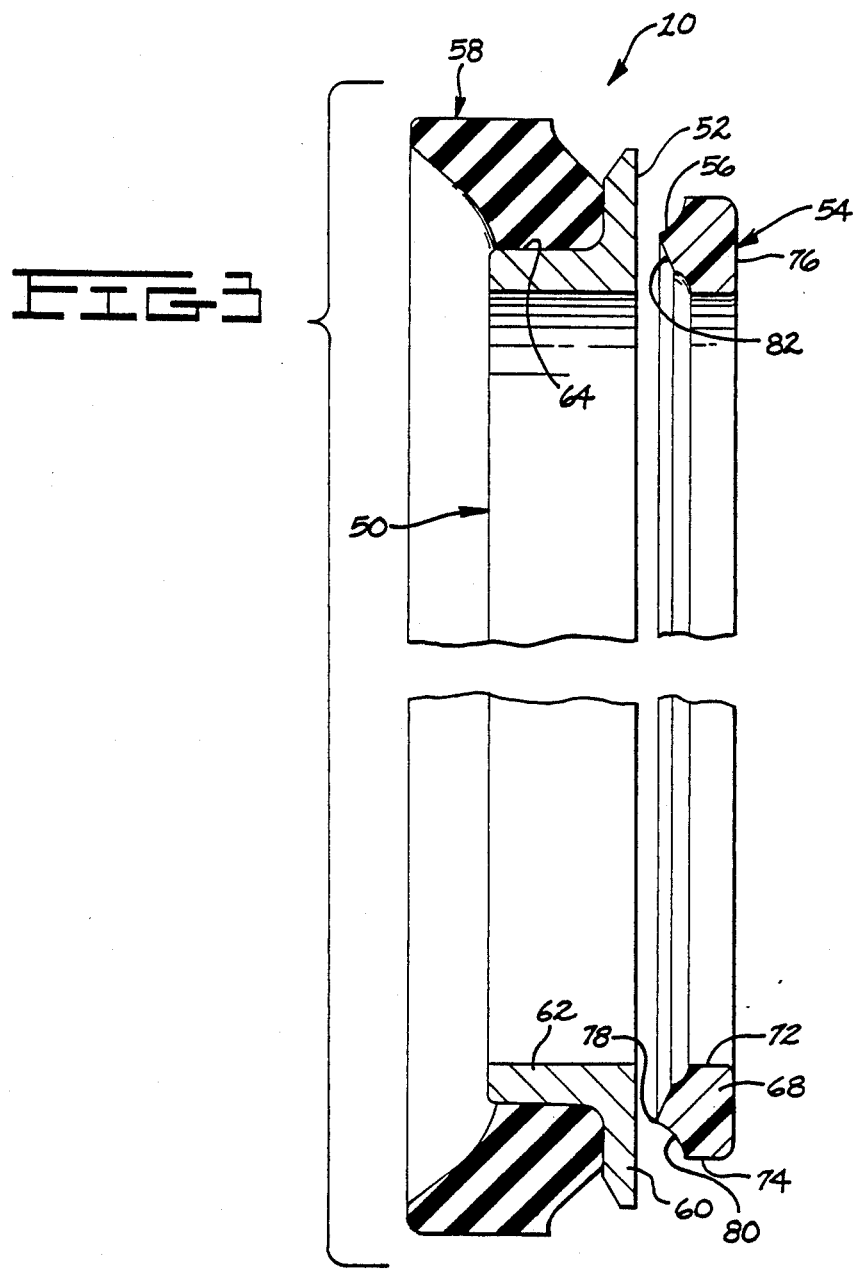

END FACE SEAL ASSEMBLY

DESCRIPTION

1. Technical Field

This invention relates generally to a seal assembly for use in severe service applications and more particularly to an end face seal assembly for a linkage joint, such as a track joint, which is subject to oscillatory rotary motions.

2. Background Art

End face seals are commonly used in severe service environments to exclude external contaminants such as grit, water, and the like from joints between relatively movable members and to retain lubricants, such as oil, therein. One such application for seals of this type is in the pin joints of endless track chains used to propell track-type earthmoving vehicles. Such track chains operate in extremely adverse environments in which the track joints may be exposed to various abrasive mixtures of water, dirt, sand, rock or other mineral or chemical elements and to wide temperature ranges varying from the heat of deserts to the cold of artic regions. Consequently, the axial face load of the seals must be maintained at a substantial level, for example 100 pounds or more, to ensure that the seal will effectively exclude contaminants and retain lubricant.

Extensive development efforts and years of experience has shown that a track seal having a tough abrasion resistant polyurethane sealing lip which is urged into axial sealing engagement against the finished end face of a track bushing by a highly resilient rubber load ring works very well in such extreme conditions. Examples of such track seals are disclosed in U.S. Pat. No. 3,841,718 to Reinsma issued on Oct. 15, 1974; U.S. Pat. No. 4,195,852 to Roley et al issued on Apr. 1, 1980; and U.S. Pat. No. 4,262,914 to Roley issued on Apr. 21, 1981, all of which are assigned to the assignee hereof. U.S. Pat No. 3,841,718 discloses a seal assembly having a crescent-shaped seal ring of polyurethane and a rubber load ring partially encompassed by the seal ring. The seal ring has a sealing flange with a seal lip thereon which is urged into sealing engagement against the end face of the bushing by the force provided by the load ring. U.S. Pat Nos. 4,195,852 and 4,262,914 each disclose an end face seal assembly having an L-shaped support ring. A polyurethane seal lip is secured to a radially extending flange portion of the support ring. A resilient load ring provides an axial force for urging the seal lip into sealing engagement against the end face of the track bushing.

While the above described seal assemblies provide excellent sealability in such severe track joint environments, some problems have been encountered with their use over long periods of time. One such problem is that of grooving of the bushing end face. A mixture of various abrasive particles and water tends to make an excellent grinding compound which, in conjunction with the high sealing forces, can wear an annular groove into the end face of the bushing after a period of use. If the groove becomes sufficiently deep, leakage can occur.

Turning of the bushing can aggravate this problem. Due to the running clearance provided between the outside diameter of the track pin and the mating inside diameter of the bushing, the groove which is worn into the bushing end face by the seal lip is slightly offcenter or eccentric to the centerline (i.e., longitudinal axis) of the bushing. After the bushing is worn externally on one side by its engagement with the drive sprocket which drives the track chain, it is common practice to "turn" the bushing, i.e., rotate it approximately 180 degrees, to expose the unworn side of the bushing to the sprocket in order to obtain the additional wear life afforded from using such unworn side. Unfortunately, this rotation of the bushing also rotates the eccentric groove so that the seal lip is then eccentric to the such groove. This causes the seal lip to run across the groove and onto a portion of the end face which had previously been exposed to the elements and made rough by corrosion. These conditions create paths for oil leakage from, and the intrusion of water, mud and abrasives into, the joint. The rough surface conditions of the bushing end face that the seal lip runs on after such bushing turn is also injurious to and accelerates the wear of the seal lip, all of which can result in the premature failure of the track joint. Thus, it can be seen that the bushing is an essential component of the track sealing system with the above described seal assemblies. Oftentimes the bushing must be replaced, instead of being turned, which means that only half of its useful wear life has been utilized. This, of course, it quite wasteful, but is oftentimes less expensive and time consuming than repairing joints as seals fail after the bushings are turned.

U.S. Pat. No. 4,295,654, issued Oct. 20, to Kawamura, et. al., discloses a seal assembly in which a wear-resistant elastomeric seal ring is urged into sealing engagement against a wear resistant annular plate by a resilient elastomeric load ring. In such seal assembly, however, the annular wear resistant plate is shown being bonded either directly to the end face of the bushing or to an intermediary elastomeric annular plate. Also, the seal ring is shown as being bonded to a reinforcing annular steel plate or directly to the load ring. While this seal assembly addresses the problem of grooving, it introduces another problem, that being the problem of bond failures. Such bond failures also result in the loss of sealing and subsequent joint failure.

The present invention is directed to overcoming one or more of the problems as set forth above.

DISCLOSURE OF THE INVENTION

In accordance with one aspect of the present invention there is provided an end face seal assembly adapted to sealing a joint wherein a first member is pivotable about an axis relative to a second member. The seal assembly includes a first seal ring having a radial sealing surface of a high, wear and corrosion resistant metal alloy, a second seal ring carried on the second member and having an annular seal lip of a wear resistant polyurethane, the seal lip being disposed for axial sealing engagement against the radial sealing surface of the first seal ring, and means for resiliently mounting the first seal ring to the first member and for urging the radial sealing surface into axial sealing engagement against the seal lip of the second seal ring.

BRIEF DESCRIPTION OF THE DRAWINGS

FIG. 3 is an enlarged cross-sectional view of the seal assembly of the present invention prior to installation.

BEST MODE FOR CARRYING OUT THE INVENTION

Figure 1:
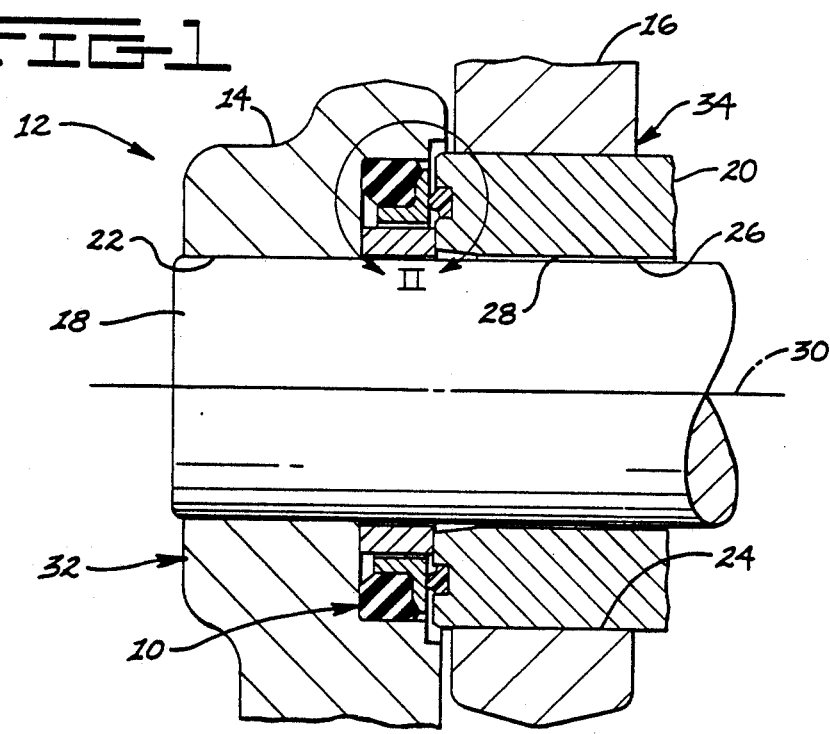
FIG. 1 is a fragmentary vertical cross-sectional view showing diagrammatically the construction of one end of a track joint incorporating an embodiment of an end face seal assembly constructed in accordance with the present invention in its position of use.

While it will be understood that the present invention may be useful in a number of environments and has general application for sealing between relatively movable members, the preferred embodiment of the invention will be particularly described with respect to its use for sealing a track joint, although it is not intended to be limited thereto. Referring to FIG. 1, an end face seal assembly 10 constructed in accordance with the present invention is shown in association with a pivot joint, such as a track joint, a portion of which is shown in FIG. 1 and which is generally indicated by the numeral 12.

The track joint 12 generally includes an outer end link portion 14, an overlapping inner end link portion 16, a track pin 18 and a cylindrical bushing 20. The outer end link portion 14 has a pin bore 22 into which one end of the pin 18 is fixedly secured, as by a press fit, so as not to undergo movement relative to each other. The inner end link portion 16 has a bushing bore 24 into which one end of the bushing 20 is similarly tightly secured, as by a press fit, so as not to undergo movement relative to each other. Bushing 20 has a pin receiving bore 26 to receive the pin 18. A slight working clearance, shown at 28, is provided between the pin bore of the bushing and the track pin so that the bushing is free to rotate with respect to the pin about the center line axis 30 of the pin. Accordingly, link portion 14 and pin 18, which singly or collectively define a first member 32 of the joint, move as a unit with respect to link porton 16 and bushing 20, which singly or collectively define a second member 34 of the joint. Thus, an endless track (not shown) as a whole is permitted to articulate at each track joint 12 as it rotates about the idler and sprocket wheels of a track-type earthmoving vehicle, also not shown.

Figure 2:
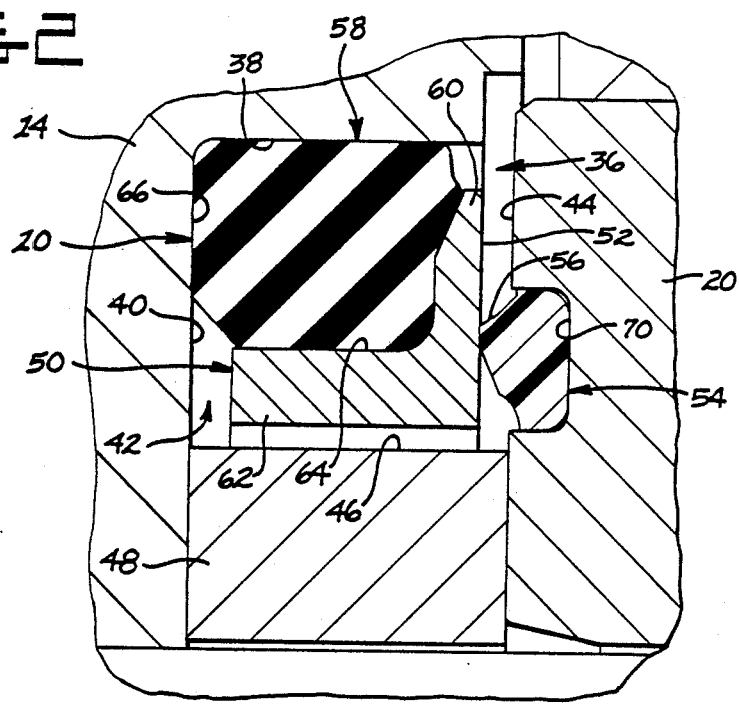
FIG. 2 is an enlarged fragmentary cross-sectional view of the embodiment of the seal assembly and the associated members of the track joint illustrated in FIG. 1.

Referring now to the working environment of the seal assembly 10, which is shown in greater detail in FIG. 2, an annular seal receiving cavity 36 is defined by an outer cylindrical surface 38 and radial end surface 40 of a counterbore 42 in link portion 14, a radial end face portion 44 of bushing 20, and an outer cylindrical surface 46 of a thrust or spacer ring 48. The spacer ring 48 is disposed intermediate the bushing end face 44 and the end surface 40 of the counterbore to limit the minimum axial distance therebetween. The inwardly opening counterbore 42 is disposed in opposing relation to the bushing end face 44.

As best shown in FIGS. 2 and 3, the seal assembly 10 of the present invention principally includes a first seal ring 50 having a radial sealing surface 52, a second seal ring 54 having an annular seal lip 56, and means, such as a load ring 58, for resiliently mounting the first seal ring 50 to the first member 32 and for urging the radial sealing surface 52 into axial sealing engagement against the seal lip 56 of the second seal ring 54.

The first seal ring 50 is of a rigid construction and preferrably has a generally L-shaped cross section providing a radially extending flange portion 60 and an axially extending flange portion 62. The flanges portions 60 and 62 define an outwardly facing seat 64 which is disposed in a diagonally opposed relationship to an inwardly facing seat 66 which is cooperatively defined by the outer surface 38 and the end surface 40 of the counterbore 42. The radial sealing surface 52 is on the side of the radial flange portion 60 which faces the bushing end face 44. Such sealing surface is made of a very hard, corrosion resistant metal alloy material and preferrably has a hardness of about Rockwell C 60. Those skilled in the art will recognize that the entire first seal ring 50 need not be made of such very hard, corrosion resistant material and that a hard, corrosion resistant sealing surface may be applied to a softer substrate material by any well known thermal, electrical, chemical or mechanical plating or deposition technique. However due to its small size, the first seal ring 50 is preferrably a unitary material exhibiting the desired hardness and corrosion resistance. An iron base chromium low molybdenum alloy has been found to be suitable for this purpose. The ring 50 may be formed by conventional metal casting or powdered metal techniques. A powdered metal material made by Hoeganaes of Riverton, New Jersey and referred to as Anchorwear 500 has been used for the seal ring 50 with satisfactory results. The sealing surface is ground flat with a relatively smooth surface finish. Preferably, such sealing surface is flat within 0.003 inch (0.076 mm) and is ground circumferentially to a finish of 12 Mu (microinch) or less.

The load ring 58 is preferably a shear loaded, synthetic rubber load ring of the type and construction disclosed and described in U.S. Pat. No. 4,195,852 which disclosure is incorporated hereinto by reference. Load ring 58 is disposed between the diagonally opposed seats 64,66 and is compressibly loaded therebetween upon assembly of the joint 12. In this loaded state, as shown in FIGS. 1 and 2, load ring 58 resiliently mounts and exerts a predetermined axial force on the first ring 50 to urge the sealing face 52 into sealing engagement against the seal lip 56.

The second seal ring 54 preferably has a body portion 68 which is integral with and made of the same polyurethane material as its seal lip 56. The body portion 68 is generally rectangular shaped to fit into a similarly shaped groove 70 provided in the end face 44 of the bushing 20. Body portion 68 has radially inner and outer axially extending surfaces 72 and 74 and a radially extending end surface 76, each of such surfaces are coextensive with and frictionally engage corresponding surfaces of groove 70 to maintain the seal ring 55 stationary relative to first member 32 and to provide a static seal therebetween during operation of the joint 12.

The seal lip 56 protrudes from the body portion 68 toward the sealing surface 52 of the first seal ring 50 and terminates at a generally sharp annular lip edge 78, as shown in FIG. 3. The seal lip 56 perferably has an arcuate outer surface 80 and a sloped inner surface 82 which connect the lip edge 78 to the body portion 68. The sloped inner surface 82 is preferably at an angle of about 70 degrees to the central axis 30 and connects at the lip edge 78 to the arcuate outer surface 80 at an angle of about 90 degrees.

INDUSTRIAL APPLICABILITY

The end face seal assembly 10 of the present invention has general applicability in a wide range of sealing applications where rotary oscilatory movements occur between two members to be sealed in the presence of abrasives and under varying climatic conditions, in addition to that of a track joint embodiment herein disclosed, as will be obvious to those skilled in the art.

One of the principal advantages of the seal assembly 10 constructed in accordance with the present invention is the elimination of the wearing of grooves into the end faces of bushings of track joints by prior art seals which utilize such end faces as dynamic sealing surfaces. The present sealing assembly 10 incorporates all such dynamic sealing functions into separate components, ie., the first and second seal ring 50,54, of the seal assembly 10 itself, thereby divorcing any of the joint components from such dynamic sealing function. In addition, such grooving is virtually eliminated in seal assembly 10 because of the use of the extremely hard and corrosion resistant material used to construct the first seal ring 50. Ring 50 is of such hardness that it exhibits very little wear throughout the service life of the track in which it is used. Therefore, the problem of grooving which has in the past resulted in the loss of lubricant from, and the entrance of abrasives into, the joint 12 is no longer a concern in such joint.

The rubber material of the load ring 58 has the ability to apply the axial force necessary to maintain the sealing surface 52 in sealing engagement against the seal lip 56 during rotary oscilation of the joint so as to exclude abrasives and other contaminates from the joint and to maintain such force during the rapid axial movements between the seal rings 50, 54 which typically occur as the result of end play in the joint.

Polyurethane is used for the second seal ring 54 because such material has been proven to be well suited for use in adverse sealing conditions where its resiliency and high wear and abrasion resistant qualities afford superior dynamic sealing capabilities. The seal ring 54 is also advantageously designed and constructed to minimize its costs and to facilitate its and the joint's ease of assembly and disassembly. In this regard, the inside diameter of the seal ring 54 is preferably sized to be slightly smaller than the inner diameter of the groove 70 into which it fits so that the ring 54 must be elastically stretched in order to be mounted into the groove. Such stretching provides a sufficient amount of hoop tension to solely maintain the ring within the groove during assembly of said joint. On the other hand, the outside diameter of the seal ring 54 may be slightly smaller than the outer diameter of the groove 70 in the stretched condition so as to facilitate its mounting in the groove without any binding occuring therebetween. However, do to its resiliency, the seal ring 54 bulges when in its loaded condition (FIGS. 1 and 2) so that the outside diameter is in tight contact with the outer diameter of the groove during operation of the joint so as to provide a static seal to exclude contaminates.

Also when loaded by the load ring 58, the end surface 76 of the seal ring 54 is forced into contact with the bottom surface of the groove 70. Preferably, the end surface 76 and the bottom surface of the groove are provided with an area contact sufficient to frictionally maintain the seal ring 4 in a fixed, non-rotational relationship to the second member 34 during rotary oscilation of the joint free of any bonding agent. Even though the second seal ring 54 is of a size and shape relative to the groove 70 to solely maintain said ring in fixed, non-rotational relationship to the second member during oscilation of the joint when in a loaded condition, it is also sized so as to be readily removable from and installable into the groove when in a free state.

Other aspects, objects and advantages of this invention can be obtained from a study of the drawings, the disclosure and the appended claims.

We claim:

1. An end face seal assembly adapted for use in sealing a joint wherein a first member of said joint is pivotable about an axis relative to a second member thereof, said first member having an annular, axially opening seal cavity about said axis, said seal assembly comprising:

a first seal ring (50) of a rigid metal construction positionable within said seal cavity and having an L-shaped cross sectional configuration defining a radially outwardly extending flange portion and an axially extending flange portion said radial flange portion having a hard, wear and corrosion resistant radial sealing surface;

a resilient second seal ring having an annular seal lip of a wear resistant polyurethane, said lip being disposed for axial sealing engagement against said radial sealing surface of said rigid first seal ring;

an elastomeric load ring being positionable between said seal cavity and said rigid first seal ring for axially urging said radial sealing surface into axial sealing engagement against said seal lip of said resilient second seal ring; and means for maintaining said second seal ring in a fixed, non-rotative relationship relatively to said second member during pivoting of said joint, said means including said second member having an annular groove opening toward said radial sealing surface of said first seal ring and said second seal ring having a body portion positionable within said groove.

2. The seal assembly of claim 1 wherein said first seal ring is of an iron base chromium low molybdenum alloy, and wherein said sealing surface has a particle hardness of at least Rockwell C60.

3. The seal assemble of claim 2 wherein said maintaining means includes said second seal ring having a body portion integral with said seal lip said body portion and said groove being of a size and configuration to provide mating, coextensive surfaces with sufficient area contact to frictionally maintain said seal ring in a fixed, non-rotational relationship to the second member during oscillation of said joint free of any bonding agent.

4. The seal assemble of claim 3 wherein said body portion and said groove have generally rectangularly shaped cross-sectional configurations with said body portion having a generally planar end surface and generally cylindrical inner and outer surfaces, said end surface being engageable against a bottom surface of said groove and said inner surface having a diameter sized sufficiently smaller than the inner surface diameter of said groove to require the seal ring to be elastically stretched in order to be mounted within said groove, said stretching providing sufficient hoop tension to solely maintain said ring within said groove during assembly of said joint.

5. The seal assembly of claim 4 wherein said outer cylindrical surface of said body has a diameter sufficient to frictionally engage a mating outer cylindrical surface of the groove when said joint is assembled and the second seal ring is in a loaded condition to assist in maintaining said second seal ring in fixed, non-rotational relationship to the second member during oscillation of said joint, but is free of such contact with said outer surface of the groove when said joint is disassembled and said second seal ring is in an unloaded condition so as to be readily removable from and installable into said groove.

6. The seal assembly of claim 5 wherein said seal lip of said second seal ring terminates at a generally sharp annular lip edge and has a generally arcuate outer surface and sloped inner surface said surfaces connecting said annular lip edge to said body portion.

7. The seal assembly of claim 6 wherein said radially and axially extending flange portions of said first seal ring cooperatively define a first seat and said cavity defines a second seat disposed in diagonally opposed relationship to said first seat, and wherein said load ring is of a rubber material of a configuration to be mounted and axially compressively shear loaded between said seats.

8. The seal assembly of claim 2 wherein said first seal ring is cast.

9. The seal assembly of claim 2 wherein said first seal ring is formed of powdered metal.

10. A track joint, comprising:
an inner end link portion having a bushing bore;
a bushing having a pin receiving bore and an end face, said bushing being fixedly secured within said bushing bore of said inner end link portion;
an outer end link portion having a pin bore and an inwardly opening counterbore about said pin bore, said counterbore being positionable in opposing relation to said bushing end face;
a pin fixedly secured within said pin bore of said outer end link portion and pivotably disposed within said pin receiving bore of said bushing whereby said inner end link portion and said bushing of said track joint are pivotable relative to said outer end link portion and said pin thereof;
an end face seal assembly having a first seal ring and a second seal ring, said first seal ring being disposed within said counterbore and having an L-shaped cross sectional configuration including a radially outwardly extending flange portion and an axially extending flange portion, said flange portions defining a seat and said radially extending flange portion defining a radial sealing surface of a hard, wear resistant metal alloy opposing said bushing end face; and said second seal ring having an annular seal lip of a wear resistant polyurethane;
means for maintaining said second seal ring in a fixed, non-rotative relationship relative to said second member during pivoting of said joint, said means including said second member having an annular groove opening toward said radial sealing surface of said first seal ring and said second seal ring having a body portion positionable within said groove; and means for resiliently mounting said first seal ring to said outer end link portion and for urging said radial sealing surface into axial sealing engagement against said seal lip of said second seal ring, said means including a rubber load ring disposed within said seat of the first seal ring.

11. The combination of claim 10 wherein said first seal ring is of an iron base chromium low molybdenum alloy casting, and wherein said sealing surface has a particle hardness of at least Rockwell C60.

12. The combination of claim 10 wherein said first seal ring is of an iron base chromium low molybdenum alloy powdered metal, and wherein said sealing surface has a particle hardness of at least Rockwell C 60.

13. The combination of claim 10 wherein said bushing end face has an annular groove therein opening toward said counterbore of said outer end link portion and wherein said second seal ring includes a body portion, said body portion and said groove having generally rectangularly shaped cross-sectional configurations and being of a size and configuration to provide mating, coextensive surfaces with sufficient area contact when said seal ring is under load to frictionally maintain said seal ring in a fixed, non-rotational relationship to said bushing during operation of said track joint free of any bonding agent.

14. The combination of claim 13, wherein said seal lip of second seal ring has a generally sharp annular lip edge defined by an arcuate outer surface and a sloped inner surface.

15. The combination of claim 14 wherein said sloped inner surface is at an angle of about 70 degrees relative to a central axis of the pin.

16. The combination of claim 15, wherein said second seal ring has an inner surface having a diameter sized sufficiently smaller than a mating inner surface diameter of said groove to require that said seal ring be elastically stetched to be mounted within said groove, said stretching providing sufficient hoop tension to solely maintain said ring within said groove during assembly of said joint.

17. The combination of claim 16, wherein said second seal ring has an outer cylindrical surface having a diameter sufficient to frictionally engage a mating outer cylindrical surface of the groove when said joint is assembled and the second seal ring is in a loaded condition to assist in maintaining said ring in fixed, non-rotational relationship to the bushing during oscillation of said joint, but is free of said contact with said outer surface of the groove when said joint is disassembled and said second seal ring is in an unloaded condition so as to be readily removable from and installable into said groove.

* * * * *